(12) United States Patent
Barkac et al.

(10) Patent No.: US 8,258,225 B2
(45) Date of Patent: Sep. 4, 2012

(54) COATING COMPOSITIONS PROVIDING IMPROVED MAR AND SCRATCH RESISTANCE AND METHODS OF USING THE SAME

(75) Inventors: Karen A. Barkac, Allison Park, PA (US); Anthony M. Chasser, Allison Park, PA (US); Roy E. Dean, Lower Burrell, PA (US); Mildred Lisa Perrine, Allison Park, PA (US); Deirdre D. Ragan, Clemmons, NC (US); Karen S. Rechenberg, Gibsonia, PA (US); John R. Schneider, Glenshaw, PA (US)

(73) Assignee: PPG Industries Ohio, Inc, Cleveland, OH (US)

( * ) Notice: Subject to any disclaimer, the term of this patent is extended or adjusted under 35 U.S.C. 154(b) by 1216 days.

(21) Appl. No.: 11/113,682

(22) Filed: Apr. 25, 2005

(65) Prior Publication Data

US 2005/0249939 A1 Nov. 10, 2005

Related U.S. Application Data

(63) Continuation-in-part of application No. 10/007,149, filed on Dec. 5, 2001, now abandoned.

(60) Provisional application No. 60/254,143, filed on Dec. 8, 2000.

(51) Int. Cl.
*C08K 3/04* (2006.01)
*C08K 3/14* (2006.01)
*C08K 3/22* (2006.01)
*C08K 3/36* (2006.01)
*C08K 3/38* (2006.01)

(52) U.S. Cl. ........ 524/401; 428/323; 428/327; 428/328; 428/329; 428/331; 428/411.1; 428/457; 428/537.1; 428/698; 428/702; 428/704; 524/404; 524/413; 524/424; 524/437; 524/492; 524/493; 524/495; 524/496; 524/700; 524/701; 524/730; 524/779; 524/783; 524/787; 524/789

(58) Field of Classification Search ............... 428/323, 428/329, 423.1, 327, 328, 331, 411.1, 457, 428/537.1, 698, 702, 704; 524/492, 588, 524/589, 590, 424, 437, 493, 495, 496, 700, 524/701, 730, 779, 783, 787, 789, 401, 404, 524/413

See application file for complete search history.

(56) References Cited

U.S. PATENT DOCUMENTS

| | | | |
|---|---|---|---|
| 4,356,037 A | 10/1982 | Novak | 106/209 |
| 4,526,910 A | 7/1985 | Das et al. | 523/220 |
| 4,650,819 A | 3/1987 | Nakamoto et al. | 523/223 |
| 4,652,470 A | 3/1987 | Das et al. | 427/407.1 |
| 4,962,137 A | 10/1990 | McKinney et al. | 523/400 |
| 5,015,671 A | 5/1991 | Ono et al. | 523/402 |
| 5,348,914 A | 9/1994 | Thometzek et al. | 501/18 |
| 5,907,006 A | 5/1999 | Rennie et al. | 524/223 |
| 5,914,162 A | 6/1999 | Bilkadi | 428/35.8 |
| 6,203,906 B1 * | 3/2001 | Christie et al. | 428/372 |
| 6,218,001 B1 | 4/2001 | Chen et al. | 428/323 |
| 6,228,433 B1 | 5/2001 | Witt | 427/487 |
| 6,255,027 B1 * | 7/2001 | Wehelie et al. | 430/65 |
| 6,387,519 B1 * | 5/2002 | Anderson et al. | 428/447 |
| 6,649,260 B2 * | 11/2003 | Kumano et al. | 428/343 |
| 2003/0125445 A1 | 7/2003 | Decker et al. | 524/494 |

FOREIGN PATENT DOCUMENTS

| | | |
|---|---|---|
| DE | 4304491 | 8/1994 |
| DE | 4426831 | 2/1995 |
| DE | 19845496 | 4/2000 |
| EP | 0106707 | 4/1984 |
| EP | 0379746 | 8/1990 |
| EP | 0437327 | 7/1991 |
| EP | 0737567 | 10/1996 |
| EP | 1038927 | 9/2000 |
| GB | 2205670 | 12/1988 |
| WO | WO 00/36034 | 6/2000 |
| WO | WO 00/52105 | 9/2000 |
| WO | WO 02/18483 A1 | 3/2002 |
| WO | WO 02/081579 A2 | 10/2002 |

\* cited by examiner

*Primary Examiner* — Rabon Sergent
(74) *Attorney, Agent, or Firm* — Krisanne Shideler; Diane R. Meyers

(57) ABSTRACT

Disclosed is a coating formed from a composition containing a film-forming resin and a plurality of particles dispersed in the resin. The average particle size of the particles is 0.1 to 50 microns, and the particles have a hardness sufficient to impart greater mar and/or scratch resistance to the coating as compared to a coating where no particles are present. Also, the difference between the refractive ranges from 1 to 1.5. A method for preparing a powder coating including the particles also is provided.

24 Claims, No Drawings

COATING COMPOSITIONS PROVIDING IMPROVED MAR AND SCRATCH RESISTANCE AND METHODS OF USING THE SAME

CROSS REFERENCE TO RELATED APPLICATIONS

This application is a Continuation-in-Part of U.S. application Ser. No. 10/007,149, filed Dec. 5, 2001, now abandoned which claims the benefit of priority of U.S. Provisional Application No. 60/254,143, filed on Dec. 8, 2000.

FIELD OF THE INVENTION

The present invention relates to coating compositions that provide improved mar and/or scratch resistance and to methods for using the same. More specifically, the improved resistance is achieved by adding particles to a film forming resin.

BACKGROUND OF THE INVENTION

In recent years, powder coatings have become increasingly popular because these coatings are inherently low in volatile organic content (VOC), which significantly reduces air emissions during the application and curing processes. Liquid coatings are still used in many systems, however. For example, the coating of automobiles, including elastomeric automotive parts, household appliances and flooring often is done using liquid coatings.

Topcoats such as the transparent clearcoat in color-plus-clear coating systems for automotive applications and/or other protective and decorative coatings such as for household appliances, are subject to defects that occur during the assembly process and damage from both the environment and normal use of the end product. Paint defects that occur during assembly can include the paint layer being too thick or too thin, "fish eyes" or craters, and under-cured or over-cured paint; these defects can affect the color, brittleness, solvent resistance and mar and scratch performance of the coating. Damaging environmental factors include acidic precipitation, exposure to ultraviolet radiation from sunlight, high relative humidity and high temperatures; these factors can also result in compromised performance. Normal use of consumer products such as appliances and flooring can lead to marring, scratching and/or chipping of the surface due to contact with hard objects, contact with brushes and/or abrasive cleansers during normal cleaning processes, and the like.

Thus, there is a need for coatings having good scratch and mar resistance, while maintaining other coating performance and appearance properties.

SUMMARY OF THE INVENTION

The present invention is directed to a coating formed from a composition comprising a film-forming resin, and a plurality of particles having an average particle size between 0.1 and 50 microns dispersed in the resin. The particles have a hardness sufficient to impart greater mar and/or scratch resistance to the coating as compared to a coating where no particle is present, and the difference between the refractive index of the resin and the refractive index of the particles ranges from 1 to 1.5.

The present invention also is directed to a method for improving scratch and/or mar resistance of a coating and method for preparing a powder coating.

DETAILED DESCRIPTION OF THE INVENTION

Other than in the operating examples, or where otherwise indicated, all numbers expressing quantities of ingredients, reaction conditions and so forth used in the specification and claims are to be understood as being prefaced by the term "about" Even if the term does not expressly appear. Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting for the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between and including the recited minimum value of 1 and the recited maximum value of 10, that is, having a minimum value equal to or greater than 1 and a maximum value of equal to or less than 10.

The present invention is directed to a coating formed from a composition comprising a film-forming resin and a plurality of particles (described in detail below) dispersed in the resin. The particles have an average particle size ranging from 0.01 to 50 microns. The particles have a hardness such that they impart greater mar and/or scratch resistance to the coating as compared to a coating where no particles are present. Also, the difference between the refractive index of the resin and the refractive index of the particles ranges from 1 to 1.5.

Any resin that forms a film can be used according to the present methods, absent compatibility problems. For example, resins suitable for both powder and liquid coating compositions can be employed.

The powder and/or liquid compositions can be thermoplastic or thermosetting compositions. The thermosetting compositions are curable compositions that may be cured at ambient (22° C. to 28° C. at atmospheric pressure), or thermally cured at elevated temperature, or radiation-curable as discussed below.

The thermosetting composition can comprise a resinous binder or resinous binder system comprising a polymer having at least one type of reactive functional group and a curing agent having functional groups reactive with the functional group of the polymer. The polymer can be selected from for example, from acrylic, polyester, polyether or polyurethane, and/or polysiloxane and/or co-polymers thereof can contain functional groups such as hydroxyl, carboxylic acid, carbamate, isocyanate, epoxy, amide amino and/or carboxylate functional groups. In the case of radiation-curable thermosetting compositions, the resinous binder can contain materials having functional groups with vinyl groups or ethylenic unsaturation.

The film-forming resin described above is generally present in the powder coating compositions in an amount greater than about 50 weight percent, such as greater than about 60 weight percent, and less than 90 weight percent, with weight percent being based on the total weight of the composition. For example, the weight percent of resin can be between 60 and 70 weight percent. When a curing agent is used, it is generally present in an amount of between about 10 and 40 weight percent; this weight percent is also based on the total weight of the coating composition.

As mentioned previously, the present compositions can comprise film-forming resins that are liquid in form, that is, water-borne or solvent-borne systems. Organic and/or inorganic particles can be added to the resin according to the present invention. In a particular embodiment of the present invention, the compositions from which the coating is formed comprise organic particles. Examples of suitable organic particle scan include but are not limited to diamond particles, such as diamond dust particles, and particles formed from carbide materials; examples of carbide particles include but are not limited to titanium carbide, silicon carbide and boron carbide.

In an embodiment of the present invention, inorganic particles may be used. Suitable inorganic particles can include but are not limited to silica; alumina; alumina silicate; silica alumina; alkali aluminosilicate; borosilicate glass; nitrides including boron nitride and silicon nitride; oxides including titanium dioxide and zinc oxide; quartz; nepheline syenite; zircon such as in the form of zirconium oxide; buddeluyite; and eudialyte.

Mixtures of any of the above particles can be used, including different combinations of organic particles, inorganic particles, or both. The silica can be in any suitable form, such as crystalline, amorphous, or precipitated; crystalline silica is particularly suitable for one-coat applications. The alumina can be used in any of its forms, such as alpha, beta, gamma, delta, theta, tabular alumina, and the like and can be fused or calcined, and if calcined, ground or unground. Alpha alumina having a crystalline structure is particularly suitable for clear coats used in the automotive industry.

The particles listed above are widely commercially available. For example, crystalline silica is available from Reade Advanced Materials; amorphous and precipitated silica from PPG Industries, Inc.; ZEEOSPHERES, silica alumina ceramic alloy particles, from 3M Corporation; silica alumina, such as G200, G-400, G-600, from 3M Corporation; alkali alumina silicate, such as W-210, W410, and W-610, from 3M Corporation; borosilicate glass, sold as SUNSPHERES, from MoSci Corporation; and quartz and nepheline syenite from Unimin, Inc. Alumina is available from Micro Abrasives Corporation as WCA3, WCA3S, and WCA3TO, and from Alcoa as T64-20. Zircon, buddeluyite and eudialyte are commercially available from Aran Isles Corporation, and boron nitride is available from Carborundum Inc. as SHP-605 and HPP-325. It will be appreciated that many commercially available products are actually composites or alloys of one or more materials; such particles are equally within the scope of the present invention.

In some embodiments, it might be desirable to pretreat the particles. In one embodiment the particles are heat-treated before incorporating them into the present compositions. Heat treating can be accomplished, for example, by heating the particles at a temperature of between about 350° C. and 2000° C., such as 600° C. and 1000° C. for a time period of two to three hours. In another embodiment, the particles can be treated or modified with a compound such as a silane. The particles may be prepared by the sol gel process. Also, the particles can be calcined or mined, or prepared by any suitable refinement process.

The particles used in the present invention can have an average particle size ranging from about 0.1 to 50 microns, such as from 0.1 to 20 microns, or 1 to 12 microns, or 1 to 10 microns, or 3 to 6 microns. The average particle size of the particles can range between any of these recited values, inclusive of the recited values. Any of the particles listed above can be used in any size within these ranges according to the present invention. In one embodiment, the average particle size is 10 microns or less, or 6 microns or less. In one embodiment of the present invention, the particles comprise silicon carbide particles having an average particle size of 20 microns or less, such as 15 microns or less. Mixtures of various particles can be used, as well as combinations of particles with varying particle sizes. For example, in an embodiment of the present invention, the plurality of particles comprises a mixture of particles a portion of which has an average particle size of 10 microns or less, and a portion of which has an average particle size of 15 microns or more.

In one embodiment, the particles comprise silicon carbide, calcined alumina and/or alumina having a median particle size of 10 microns or less, or 6 microns or less, or 5.5 microns or less, or 3 microns or less. In one embodiment the particles are unground calcined alumina having a median crystallite size of less than 5.5 microns, such as about 2 microns. "Average particle size" refers to the size of about 50 percent or more of the particles in a sample. "Median particle size" refers to the particle size at which half of the distribution is larger and half is smaller; "median crystallite size" is similarly defined, but using the crystallite size rather than the particle size.

Particle size can be determined according to any method known in the art, such as by a conventional particle size analyzer. For example, where the average particle size is greater than 1 micron laser scattering techniques can be employed, and for average particle sizes smaller than 1 micron, transmissional electron microscopy ("TEM") can be used.

The shape or morphology of the particles can vary depending on the type of particle or particles selected. For example, generally spherical particles, such as crystalline materials, solid beads, microbeads, or hollow spheres, can be used, as can particles that are platy, cubic or acicular (that is, elongated or fibrous). The particles can also have a random or nonuniform morphology. In addition, the particles can have an internal structure that is hollow, porous or void free, or any combination, such as a hollow center with porous or solid walls. It will be appreciated that different particle shapes may be more suitable for one application over another. For example, when used with automotive clearcoats, particles having a platy morphology may have better mar resistance than those having spherical or other nonspherical forms. Particle shape may be irrelevant, however, for other applications. It will be appreciated that combinations of particles having different morphologies can be used to give the desired characteristics to the final coating. In an embodiment of the invention, the particles can have a spherical, platy, non-uniform, crystalline (including single- or multil-crystal structures), and/or amorphous morphology.

The particles should have a hardness sufficient to impart greater protection from mar and/or scratch than would be achieved in a coating prepared from the same resin or resinous binder system, but lacking the particles. For example, the particles can have a hardness value greater than the hardness value of materials that can scratch or mar a cured coating, such as dirt, sand, rocks, glass, abrasive cleaners, car wash brushes, and the like. The hardness value of the particles and materials that can scratch or mar a coating can be determined by any conventional hardness measurement method, but is typically determined according to the Mohs hardness scale. The Mohs scale is an empirical scale of the hardness of minerals or mineral-like materials, and indicates the relative scratch resistance of the surface of a material. The original Mohs scale consisted of the values ranging from 1 to 10, with talc having a value of 1 and diamond having a value of 10. The scale has recently been expanded from a maximum value of 10 to a maximum value of 15 to accommodate the addition of some synthetic materials. All of the Mohs hardness values discussed herein, however, are based upon the original 1 to 10 scale.

The Mohs hardness values of several particles within the scope of the invention are given in Table A below.

TABLE A

| PARTICLE MATERIAL | MOHS HARDNESS |
|---|---|
| Silicon nitride | 9+ |
| Zinc oxide | 4.5 |
| Crystalline silica | 6.5-7.0 |
| Titanium carbide | 9.0 |
| α-alumina | 9.0 |
| γ-alumina | 8.0 |
| Borosilicate glass | 4.5-6.5 |
| Diamond | 10.0 |
| Boron carbide | 9.7 |
| Silicon carbide | 9.3 |

Typically, the particles used according to the present invention will have a Mohs hardness of 4.5 or greater, such as 5 or greater or 8 or greater. For automobile clearcoats, particles having a Mohs hardness of 9 or 10 may be suitable. In one embodiment, the Mohs hardness of the particles is between 4.5 and 8, such as between 4.5 and 7.5, or 4.5 and 7.

It will be appreciated that many particles, particularly the inorganic particles, according to the present invention have a hardness at their surface that can be different from the hardness of the internal portions of the particle. The hardness of the surface is typically the hardness relevant to the present invention.

The incorporation of the aforementioned particles into a film-forming resin or resinous binder system can result in a coatings having enhanced mar and/or scratch resistance as compared with the same coatings lacking these particles. According to the present invention, coatings can be formulated with these improved mar and/or scratch characteristics without affecting the appearance or other mechanical properties of the coatings.

"Mar" and "scratch" refer herein to physical deformations resulting from mechanical and/or chemical abrasion. "Mar resistance" is a measure of a material's ability to resist appearance degradation caused by small scale mechanical stress. "Scratch resistance" is the ability of a material to resist more severe damage that can lead to visible, deeper or wider trenches. Thus, scratches are generally regarded as being more severe than what is referred to in the art as mar, and the two are regarded in the art as being different. As noted above, mar and scratch can result from manufacturing and environmental factors as well as through normal use. Although mar and scratch are in many respects differing degrees of the same thing, a coating that improves mar resistance may not be effective in improving scratch resistance, and vice versa. It will be appreciated, therefore, that one single particle type or, alternatively, combinations of particles can be employed to give the final coating its desired characteristics. For example, one particle that offers particularly good mar resistance can be coupled with one that offers particularly good scratch resistance.

As noted above, the particles or combination of particles used in the present invention should generally have a hardness sufficient to impart improved protection from mar and/or scratch as compared to no particle being present. Accordingly, the compositions of the present invention, when cured, will have greater mar and/or scratch resistance than their particle-lacking counterparts. Gloss retention percentages following mar and/or scratch testing ranging from 20 percent up to near 100 percent are achieved, such as 20 percent or greater retention, 50 percent or greater retention, or 70 percent or greater retention, or 90 percent or greater retention. To determine whether improved mar and scratch resistance is obtained with a particular particle or combination of particles, two coating compositions can be formulated, with the only difference being that one contains the present particles and one does not. The coatings can be tested for mar and/or scratch resistance (i.e. "mar and/or scratch testing") by any means standardly known in the art, such as those described in the Example section below. It will be understood by those skilled in the art that the mar and/or scratch test used will be appropriate to the coated substrate end-use, e.g. an automotive topcoat may be tested by a different method than a coating for flooring, including vinyl and wood flooring. The results for the particle-containing and nonparticle-containing compositions can be compared to determine whether improved resistance is obtained when the selected particles are added. Even a small improvement in any of these tests constitutes an improvement according to the invention. It will be appreciated that mar and scratch resistance, and methods for testing the same, are distinct from "wear-through", weight loss, or bulk-film properties tested, for example, using a Taber abrader, and that such tests are typically relevant to products other than those of the present invention.

The particles can be present in the coating compositions of the present invention in an amount ranging from 0.01 to 25.0 weight percent, such as from 0.01 to 20 weight percent, or from 0.01 to 10 weight percent, or from 0.05 to 8 weight percent, or from 1 to 3 weight percent, with weight percent based on total weight of the coating composition. In one embodiment, the particles are present in a concentration of greater than 5 weight percent, such as greater than 5 up to 20 weight percent. While amounts of 20 weight percent or less are typically suitable, amounts even greater than 20 weight percent can also be used.

It will be appreciated that improvement in mar and scratch resistance typically will increase as the concentration of particles increases. The tests described in the Example section below can be used by those skilled in the art to determine what weight percent or "load" of particles will give the desired level of protection. The particles will be fairly evenly dispersed in the cured coating, that is, there will not typically be an increased concentration of particles in one portion of the cured coating as compared with another.

Both the size of the particles used as well as the particle load can affect not only the level of mar and/or scratch resistance but also the appearance of the cured coating. Thus, particle size and load should be optimized by the user based on the particular application, taking into account, for example, the level of acceptable haze, the level of mar and/or scratch resistance, the thickness of the coating and the like. Where appearance is particularly relevant, such as in an automotive clear coat, a relatively low load and particle size can be used. For example, a load of 5 weight percent or less, or 1 weight percent or less, or 0.1 weight percent or less, and a particle size of up to and including 8 microns, such as a particle size up to and including 6 microns may be particularly suitable. For industrial one-coat systems where haze is not as relevant, or where other pigments are present, loadings of up to about 10 percent or even higher can be used, for example, 1 to 5 percent, with particle sizes of 10 microns or even larger, such as 15 microns or larger. One skilled in the art can optimize particle size and load to achieve the desired level of mar and/or scratch resistance without compromising the appearance or other mechanical properties of the cured coatings. Mixtures of particles having different sizes may be particularly suitable for a given application.

In an embodiment of the present invention, the particles are present in the composition in an amount of 0.01 to 0.1 weight percent, and the particles have an average particle size ranging from 0.1 to 15 microns. Haze can also be minimized to at least some degree by selecting resins and particles that have a similar refractive index ("RI"), that is the difference between the resin RI and the particle RI ("Δ RI") is minimized. In some applications, such as for clear coats, the Δ RI ranges from 1 to 1.5, such as from 1 to 1.4, or 1 to 1.2. Using a combination of particles having different RI's can also help to reduce haze. Minimizing Δ RI is particularly relevant when the particles are larger in size (i.e. greater than about 6 microns) and/or the particle load is greater than about 8 weight percent. Typically, when the RI of the particle is close to the RI of the resin, the particles may comprise a greater weight percent of the present compositions. In some instances, for some materials having particularly high RI values, low particles sizes can, in fact, give a more hazy appearance than the same material at a mid-range particle size. As the particle size further increases for such materials, haze will increase as well.

In another embodiment of the present invention, in addition to the particles described above, nanoparticles are also incorporated into the present compositions. "Nanoparticles" is used herein to refer to particles having an average particle size from 0.8 to less than 500 nanometers, such as between 10 and 100 nanometers. Such nanoparticles can include both organic and inorganic particulate materials, such as those formed from polymeric and nonpolymeric organic and inorganic materials, composite materials, and mixtures thereof. As used herein, the term "polymeric inorganic material" means a polymeric material having a backbone repeat unit based on an element or elements other than carbon, for example silicon; "polymeric organic materials" means synthetic polymeric materials, semisynthetic polymeric materials and natural polymeric materials, all of which have a backbone repeat unit based on carbon. "Composite material" refers to a combination of two or more different materials that have been combined. The nanoparticles formed from composite materials can have a hardness at their surface that is different from the hardness of the internal portions of the particle. The surface of the nanoparticles can be modified such as by chemically or physically changing its surface characteristics using techniques known in the art. For example, the nanoparticles can be dispersed in siloxane, such as one to which an acid functional group has been added. In addition, a nanoparticle formed from one material can be coated, clad or encapsulated with a different material or different form of the same material to yield a particle having the desired surface characteristics.

The nanoparticles suitable for use in the compositions of the invention can be formed from ceramic materials, metallic materials, or mixtures thereof or can comprise, for example, a core of essentially a single inorganic oxide such as silica in colloidal, fumed, or amorphous form, alumina or colloidal alumina, titanium dioxide, cesium oxide, yttrium oxide, colloidal yttrium, zirconia such as colloidal or amorphous zirconia or mixtures thereof, or an inorganic oxide of one type upon which is deposited an organic oxide of another type. Materials useful in forming the present nanoparticles include graphite, metals, oxides, carbides, nitrides, borides, sulfides, silicates, carbonates, sulfates and hydroxides.

As discussed above, in many applications it will be desired that the use of the present particles and, when employed, the nanoparticles should not significantly interfere with the optical properties of the cured coating composition, particularly when the cured coating serves as a transparent coating, or as a clearcoat in a color-plus-clear system. Optical properties and coating "clarity" can be evaluated by measuring the haze of the cured coating. For purposes of the present invention, haze is measured using a BYK/Haze Gloss instrument following the manufacturer's instructions.

The difference between the haze value of a cured coating with the particles and the haze value of a cured coating without the particles ("Δ haze value") of less than about 10 or even lower is typically desired for most applications. A Δ haze value of 5 or less is typically desired when using the present compositions as a transparent topcoat.

As previously mentioned compositions of the present invention can comprise liquid coating compositions or coating compositions in solid particulate form, i.e., a powder coating composition.

The powder coating compositions of the present invention may optionally contain additives such as waxes for flow and wetting, flow control agents, such as poly(2-ethylhexyl)acrylate, degassing additives such as benzoin and MicroWax C, adjuvant resin to modify and optimize coating properties, antioxidants, ultraviolet (UV) light absorbers and catalysts. Examples of useful antioxidants and UV light absorbers include those available commercially from Ciba-Geigy under the trademarks IRGANOX® and TINUVIN®. These optional additives, when used, are typically present in amounts up to 20 percent by weight, based on total weight of the coating composition.

The liquid compositions of the present invention similarly can contain optimal additives such as plasticizers, antioxidants, light stabilizers, UV absorbers, thixotropic agents, anti-gassing agents, organic cosolvents, biocides, surfactants, flow control additives, catalysts, photoinitiators, and/or photosensitizers where appropriate. Any such additives known in the art can be used, absent compatibility problems.

The particles used in the compositions of the present invention can be added at any time during the formulation of the powder or liquid coating. For example, curable powder coating compositions of the present invention can be prepared by first dry blending the film-forming resin, the plurality of particles, and any of the additives described above, in a blender, such as a Henschel blade blender. The blender is operated for a period of time sufficient to result in a homogenous dry blend of the materials. The blend is then melt blended in an extruder, such as a twin screw co-rotating extruder, operated within a temperature range sufficient to melt but not gel the components. The melt blended curable powder coating composition is typically milled to an average particle size of from, for example, 15 to 80 microns. Other methods known in the art can also be used.

Alternatively, the present powder compositions can be prepared by blending and extruding the ingredients as described above, but without the present particles. The particles then can be added as a post-additive to the formulation, such as through a second extrusion process or by simply mixing the particles into the blended composition, such as by shaking them together in a closed container or using a Henschel mixer. While compositions comprising post-added particles surprisingly have been found to give better mar and/or scratch resistance, the particles may be incorporated into the formulation with the other dry ingredients. The manner of formulating the present compositions can therefore be determined by one skilled in the art depending on the application and desired parameters of the user.

The coating compositions of the invention can be applied to any of a variety of substrates including, but not limited to metallic, polymeric, wood (including wood composites), and glass substrates. For example, the compositions can be applied to automotive substrates such as fenders, hoods, doors, wheels, and bumpers, and industrial substrates such as household appliances, including washer and dryer panels and lids, refrigerator doors and side panels, lighting fixtures, metal office furniture and wood substrates such as wood flooring and cabinets.

The powder coating compositions are most often applied by spraying, and in the case of a metal substrate, by electrostatic spraying, or by the use of a fluidized bed. The powder coating can be applied in a single sweep or in several passes to provide a film having a thickness after cure of from about 1 to 10 mils (25 to 250 micrometers), usually about 2 to 4 mils (50 to 100 micrometers). Other standard methods for coating application also can be employed such as brushing, dipping or flowing.

The liquid compositions of the invention can also be applied by any conventional method such as brushing, dipping, flow coating, roll coating, conventional and electrostatic spraying. Typically, film thickness for liquid coatings can range between 0.1 and 5 mils, such as between 0.1 and 1 mil, or about 0.4 mils.

After application of the coating composition, the coated substrate can be heated to a temperature and for a time sufficient to cure the coating. Metallic substrates with powder coatings are typically cured at a temperature ranging from 250° F. to 500° F. (121.1° C. to 260.0° C.) for 1 to 60 minutes, or from 300° F. to 400° F. (148.9° C. to 204.4° C.) for 15 to 30 minutes.

Liquid formulations can be cured at ambient temperature, such as those using a polyisocyanate or polyanhydride curing agent, or they can be cured at elevated temperatures to hasten the cure. An example would be forced air curing in a down draft booth at about 40° C. to 60° C., which is common in the automotive refinish industry. The ambient temperature curable compositions are usually prepared as a two (2) package system in which the curing agent is kept separate from the polysiloxane containing the reactive functional group. The packages are combined shortly before application.

The thermally curable liquid compositions such as those using a blocked isocyanate, aminoplast, phenoplast, polyepoxide or polyacid curing agent can be prepared as a one-package system. These compositions typically can becured at elevated temperatures, for 1 to 30 minutes at a temperature ranging from 250° F. to 450° F. (121° C. to 232° C.) with temperature primarily dependent upon the curing mechanism of the coating composition components as well as the type of substrate used. Dwell time (i.e., time that the coated substrate is exposed to elevated temperature for curing) is dependent upon the cure temperatures used as well as wet film thickness of the applied coating composition. For example, coated automotive elastomeric parts require a long dwell time at a lower cure temperature (e.g., 30 minutes 250° F. (121° C.), while coated aluminum beverage containers require a very short dwell time at a very high cure temperature (e.g., 1 minute 375° F. (191° C.)).

As previously mentioned, the liquid coating compositions of the present invention can include radiation-curable coating compositions, that is, compositions capable of curing by ionizing radiation and/or actinic radiation.

As used herein, "ionizing radiation" means high energy radiation and/or the secondary energies resulting from conversion of this electron or other particle energy to neutron or gamma radiation, said energies being at least 30,000 electron volts and can be 50,000 to 300,000 electron volts. While various types of ionizing irradiation are suitable for this purpose, such as X-ray, gamma and beta rays, the radiation produced by accelerated high energy electrons or electron beam devices also can be used. The amount of ionizing radiation in rads for curing compositions according to the present invention can vary based upon such factors as the components of the coating formulation, the thickness of the coating upon the substrate, the temperature of the coating composition and the like.

"Actinic radiation" is light with wavelengths of electromagnetic radiation ranging from the ultraviolet ("UV") light range, through the visible light range, and into the infrared range. Actinic radiation which can be used to cure coating compositions of the present invention generally has wavelengths of electromagnetic radiation ranging, for example, from 150 to 2,000 nanometers. Suitable non-limiting examples of ultraviolet light sources can include mercury arcs, carbon arcs, low, medium or high pressure mercury lamps, swirl-flow plasma arcs and ultraviolet light emitting diodes.

Radiation-curable compositions of the present invention, in addition to the plurality of particles discussed previously, can include any of a variety of art-recognized materials having a radiation-curable reactive functional group. Such radiation-curable functional groups can include, for example, vinyl groups, vinyl ether groups, (meth)acrylate (i.e., methacrylate or acrylate) epoxy groups, maleimide groups, and/or fumarate groups. Such radiation-curable functional group-containing materials can include urethanes, acrylics, melamines, polyvinylchlorides, polyolefins, and the like. In an embodiment of the present invention, the radiation-curable composition comprises an acrylated urethane.

Such compositions also can include photopolymerization initiators and/or sensitizers as are generally known in the art. Examples of photoinitiators include isobutyl benzoin ether, mixtures of butyl isomers of butyl benzoin ether, $\alpha,\alpha$-diethoxyacetophenone, and $\alpha,\alpha$-dimethoxy-$\alpha$-phenylacetophenone. Examples of photosensitizers include benzophenone, anthraquinone, thioxanthone and phosphine oxides. UV stabilizers can also be added including benzotriazoles, hydrophenyl triazines and hindered amine light stabilizers, for example those commercially available from Ciba Specialty Chemicals in their TINUVIN line.

Other additives standardly used in the art can also be included in such compositions. Such additives can include organic solvents such as esters, for example n-butyl acetate, ethyl acetate and isobutyl acetate; ether alcohols, such as ethylene glycol monoethyl ether, ethylene glycol monobutyl ether, propylene glycol monomethyl ether, dipropylene glycol monoethyl ether, propylene glycol monoethylether acetate, ethylene glycol monoethylether acetate, dipropylene glycol monoethylether acetate and diethylene glycol monoethylether acetate; ketones, such as methyl ethyl ketone, methyl n-butyl ketone and methyl isobutyl ketone; lower alkanols containing 2 to 4 carbon atoms, such as ethanol, propanol, isopropanol and butanol; and aromatic hydrocarbons, such as xylene, toluene and naphtha. Other additives can also be used if desired, including rheology modifiers, flow additives, deaerators, gloss control additives, diluents, etc.

It will be appreciated that the resinous binders used in the coating compositions of the present invention are not limited to those in which a thermally-curable or radiation-curable binder is present. For example, moisture cure urethanes, air drying alkyds, catalyzed alkyds, ambient temperature cure epoxy-amines and hydroxy-isocyanates, heat curable epoxy-acids, hydroxyl-aminoplast as well as other aminoplast curing chemistries, lacquers such as acrylics or polyester lacquers or dispersions can all be used according to the present invention. The binders can be organic solvent based or aqueous based.

The coating compositions of the invention are particularly useful as transparent monocoats or as clear coats in color-clear composite coatings such as for automotive applications. Also, the compositions of the invention in the pigmented form can be applied directly to a substrate to form a color coat. The color coat may be in the form of a primer for subsequent application of a top coat or may be a colored top coat. When used as a primer coating, film thicknesses of 0.4 to 4.0 mils are typical. When used as a color topcoat, coating thicknesses of about 0.5 to 4.0 mils are usual, and when used as a clearcoat, coating thicknesses of about 1.5 to 4.0 mils can be used.

Accordingly, the present invention is further directed to a substrate coated with one or more of the present compositions. The substrates and compositions, and manner of applying the same, are as described above.

It will be appreciated that in the case of wood flooring, a number of different layers may be applied to the flooring, either before or after installation; these layers can include, for example, a stain coating, an abrasion resistant sealer, an adhesion promoter and a topcoat. Any of the coating compositions of the present invention, particularly the liquid compositions, can comprise any of these layers. Accordingly, the present invention is further directed to a wood flooring comprising at least one coating layer, wherein the coating layer is formed from any of the aforementioned the coating compositions of the present invention. Typically, such wood flooring will have two or more coating layers.

The present invention is further directed to a multi-layer composite coating composition comprising a base coat deposited from a film-forming composition and a topcoat applied over at least a portion of the base coat, where the topcoat is deposited from any of the coating compositions of the present invention. The base coat can have a cured film thickness ranging from 0.5 to 4 mils (12.5 to 100 micrometers) while the topcoat cured film thickness can be up to 10 mils (250 micrometers). The base coat can be cured before application of the topcoat, or the two coats can be cured together. In one example, the base coat can be deposited from a pigmented film-forming composition, while the topcoat formed from the present compositions is substantially transparent. This is the color-plus-clear system discussed above, frequently used in automotive applications.

In yet another embodiment, the present invention is directed to a method for improving the mar and/or scratch resistance of a coated substrate comprising applying any of the present compositions of the present invention to at least a portion of the substrate. Application can be by any means known in the art to the thicknesses described above.

The coatings formed according to the present invention have outstanding appearance properties, wear resistance, and/or scratch and mar resistance properties as compared to compositions where no particles are present. The compositions of the present invention also can be used to form coatings having exceptional resistance to UV degradation. Accordingly, the invention is further directed to a cured coating having particles dispersed throughout, such as a coating formed from any of the powder or liquid coating compositions previously described, having less than 10 percent, such as less than 5 percent or even less than 4 percent, reduction in gloss after 500, 1000, and 1500 hours of QUV exposure.

Examples

Each of Examples 1 through 8 shown below describes the preparation of an epoxy-acid powder clear coating composition. Each of Examples 2 to 8 describe the preparation of compositions containing a plurality of particles in accordance with the present invention, while Comparative Example 1 describes the preparation of an analogous composition which contains no particles. Amounts listed indicate parts by weight.

| | | | | | | | | |
|---|---|---|---|---|---|---|---|---|
| | | | | Powder Clearcoat Patent Example A through H | | | | |
| Description | Example 1 Comparative | Example 2 0.1% WCA-3 | Example 3 0.025% GC2000 | Example 4 0.05% GC2000 | Example 5 0.1% GC2000 | Example 6 0.5% GC2000 | Example 7 0.05% GC3000 | Example 8 0.05% LS6BXF |
| [1]Acrylic Resin | 68.97 | 68.97 | 68.97 | 68.97 | 68.97 | 68.97 | 68.97 | 68.97 |
| [2]DDDA | 22.76 | 22.76 | 22.76 | 22.76 | 22.76 | 22.76 | 22.76 | 22.76 |
| Benzoin | 0.20 | 0.20 | 0.20 | 0.20 | 0.20 | 0.20 | 0.20 | 0.20 |
| [3]WAX C | 0.60 | 0.60 | 0.60 | 0.60 | 0.60 | 0.60 | 0.60 | 0.60 |
| [4]TINUVIN 144 | 2.00 | 2.00 | 2.00 | 2.00 | 2.00 | 2.00 | 2.00 | 2.00 |
| [5]TINUVIN 405 | 2.00 | 2.00 | 2.00 | 2.00 | 2.00 | 2.00 | 2.00 | 2.00 |
| [6]HCA-1 | 2.00 | 2.00 | 2.00 | 2.00 | 2.00 | 2.00 | 2.00 | 2.00 |
| [7]ARMEEN M2C | 0.37 | 0.37 | 0.37 | 0.37 | 0.37 | 0.37 | 0.37 | 0.37 |
| [8]Flow Additive | 1.10 | 1.10 | 1.10 | 1.10 | 1.10 | 1.10 | 1.10 | 1.10 |
| Total | 100.00 | 100.00 | 100.00 | 100.00 | 100.00 | 100.00 | 100.00 | 100.00 |
| [9]WCA-3 | | 0.1 | | | | | | |
| [10]GC2000 | | | 0.025 | 0.05 | 0.1 | 0.5 | | |
| [11]GC3000 | | | | | | | 0.05 | |
| [12]LS6BXF | | | | | | | | 0.05 |

[1]Acrylic copolymer comprsing 50% glycidal methacrylate/10% butyl methacrylate/5% styrene/35% methyl methacrylate.
[2]Dodecanedioic Acid.
[3]WAX C MICRO POWDER, a fatty acid amide (ethylene bis-stearoylamide), commercially available from Hoechst-Celanese.
[4]TINUVIN 144 (2-tert-butyl-2-(4-hydroxy-3,5-di-tert-butylbenzyl)[bis(methyl-2,2,6,6,-tetramethyl-4-piperidinyl)]dipropionate), an ultraviolet light stabilizer available from Ciba-Geigy Corp.
[5]TINUVIN 405 (2-[4((2-Hydroxy-3-(2-ethylhexyloxy)propyl)-oxy]-2-hydroxyphenyl)-4,6-bis(2,4-dimethylphenyl)-1,3,5-triazine), an ultraviolet light stabilizer available from Ciba-Geigy Corp.
[6]HCA-1, an anti-yellowing agent commercially available from Sanko Chemical Corp.
[7]Methyl dicocoamine available from Akzo-Nobel Corp.
[8]Acrylic flow agent prepared by solution polymerization in xylene and toluene of 81.2% 2-ethyl hexyl acrylate, 11.8% hydroxyethyl acrylate, and 7% N,N-dimethylaminoethyl methacrylate in the presence of 2,2'-Azobis-(2-methylbutyronitrile)(100% solids).
[9]Aluminum oxide platelets, 3 micron mean particle size, available from MicroAbrasives Corporation.
[10]Green silicon carbide, 6.5 micron mean particle size, available from MicroAbrasive Corporation.
[11]Green silicon carbide, 4 micron mean particle size, available from MicroAbrasive Corporation.
[12]Diamond powder, 12 micron mean particle size, available from Lands Superabrasives.

The components were blended in a Henschel Blender for 60 to 90 seconds. The mixtures were then extruded through a Werner & Pfleider co-rotating twin screw extruder at a 450 RPM screw speed and an extrudate temperature of 100° C. to 125° C. The extruded material was then ground to a particle size of 17 to 27 microns using an ACM Grinder (Air Classifying Mill from Micron Powder Systems, Summit, N.J.) to produce final powder compositions. The particles then were post-added to the respective final powder compositions. The finished powders were electrostatically sprayed onto test panels and evaluated for coatings properties as described below.

Test Panel Preparation:

Test panels were coated with an electrodepositable primer commercially available from PPG Industries, Inc. as ED6061. Each of the powder coating compositions of Examples 1-8 was applied at a film thickness of 2.3 to 2.8 mils (58 to 71 microns) heated for 30 minutes at a temperature of 293° F. (145° C.) to cure the coatings. The test panels were then tested for mar resistance as described below.

Initial 20° gloss/haze measurements were done using a Byk Gardner Gloss Haze Meter. Mar resistance tests were performed using an Atlas Mar Tester as follows. A 2"×2" piece of 2μ abrasive paper available from 3M backed by a felt cloth was clamped to the acrylic finger on the arm of the instrument, and two sets of ten double rubs was run on each test panel. Each panel was then washed with cool tap water and dried. Mar resistance is expressed as the percentage of the 200 Gloss which is retained after the surface was marred by the mar tester. Mar resistance was measured as: Mar Resistance=(Marred Gloss÷Original Gloss)×100. Results are presented in Table 1 below.

TABLE 1

| EXAMPLE | % Particle | Initial 20° Gloss | Initial Haze | % Gloss (Retained After Mar) |
|---|---|---|---|---|
| Example 1 (comparative) | — | 85 | 20 | 55 |
| Example 2 | 0.1% WCA-3 | 85 | 22 | 77 |
| Example 3 | 0.025% GC2000 | 84 | 22 | 74 |
| Example 4 | 0.05% GC2000 | 85 | 23 | 80 |
| Example 5 | 0.1% GC2000 | 84 | 26 | 93 |
| Example 6 | 0.5% GC2000 | 82 | 47 | 96 |
| Example 7 | 0.05% GC3000 | 84 | 24 | 93 |
| Example 8 | 0.05% LS6BXF | 84 | 23 | 79 |

Example 9

This example describes the preparation of three radiation-curable liquid coating compositions. Example 9A describes the preparation of a radiation-curable coating composition containing alumina. Examples 9B and 9C describe the preparation of analogous compositions additionally containing silica and silicon carbide, respectively. The radiation-curable compositions were prepared by blending the ingredients listed below. Amounts listed indicate parts by weight.

| Ingredients | Example 9A |
|---|---|
| Urethane acrylate oligomer[1] | 32.9 |
| Isodecyl acrylate[2] | 5.8 |
| 1,6-hexanedioldiacrylate[3] | 5.0 |
| n-vinyl 2-pyrrolidone[4] | 8.0 |
| ditrimethylol propane tetraacrylate[5] | 28.0 |
| Tripropylene glycol diacrylate[6] | 9.3 |
| Hydroquinone monomethyl ether[7] | 0.015 |
| WCA3S[8] | 4.0 |
| CERIDUST 5091 wax[9] | 2.5 |
| PERENOI F-60[10] | 0.16 |
| DISPERBYK 110[11] | 0.5 |
| Benzophenone[12] | 1.8 |
| DAROCUR 1173[13] | 1.7 |
| AIREX 920[14] | 0.2 |

[1]Aliphatic urethane acrylate oligomer resin.
[2]Isodecyl acrylate, SR395 from Sartomer Company.
[3]Hexanedioldiacrylate, SR238 from Sartomer Company.
[4]n-vinyl-2-pyrrolidone, V-pyrol/RC from ISP Technologies Inc.
[5]Ditrimethylolpropane tetracrylate, SR355 from Sartomer Company.
[6]Tripropyleneglycol diacrylate, SR306 from Sartomer Company.
[7]Hydroquinone monomethyl ether from Eastman Chemical.
[8]WCA3S alumina platelets from Micro Abrasives Corporation, average particle size is 4 microns, Mohs hardness of 9.
[9]CERIDUST 5091 wax from Clariant Additives.
[10]PERENOL F-60 surfactant available from Cognis.
[11]DISPERBYK 110 dispersing additive from Byk-Chemie USA.
[12]Benzophenone from Cognis Coatings and Inks.
[13]DAROCUR 1173 from Ciba Specialty Chemicals Additives.
[14]AIREX 920 additive from Tego Chemie Service GMBH.

The radiation curable liquid clear coat composition identified as Example 9A above was prepared using the components and amounts (parts by weight) shown, with the ingredients dispersed uniformly using cowles blade agitation. Examples 9B and 9C below were prepared by adding the indicated quantity of particles to 100 grams of Example 9A and dispersing the particles therein.

Each of the coating compositions was applied to maple veneer boards that had been prepared as follows. C836E35 gunstock UV stain (available commercially from PPG Industries, Inc.) was wiped onto a board; and excess stain was removed. The stain was flashed at a temperature of 50° C. to 60° C. for about 5 minutes to remove solvent, and cured by exposure to 300 mJ/cm2 using 80 W/cm medium pressure mercury UV curing lamps (part no. 25-20008-E), available from Western Quartz Products, Inc. About fifteen microns of R667Z74 UV coating (available commercially from PPG Industries, Inc.) was then applied using a Dubois roll coater. The coating was cured by exposure to 325 mJ/cm2 using the lamps described above. The coating surface was scuff sanded using a red 3M Scotchbrite pad. About 20 microns of the Example coatings were applied using a Dubois roll coater, and the coatings were cured by exposure to 850 mJ/cm2 using the above described lamps.

For each coated substrate, the initial 60° gloss was measured using a microTrigloss meter available from Byk-Gardener Instrument Company, Inc. Scratch resistance was performed using a Gardner abrasion tester where the weight load was 1 pound and 80 grit black wet and dry sandpaper available from 3M was attached as the scrub surface. Scratch resistance was run for 100 cycles. Final gloss measurements were then performed. Gloss retention was determined as the final gloss divided by initial gloss, multiplied by 100. Results are presented below in the following Table 2.

TABLE 2

|  | Example 9A | Example 9B | Example 9C |
|---|---|---|---|
| Additional particle | None | OK412[1] | SIC 400 green[2] |
| Grams particle added |  | 4 | 1 |
| Initial gloss | 84 | 75 | 79 |
| % Gloss retention | 25% | 51% | 93% |

[1]OK412, wax treated silica from Degussa, average particle size is 4 microns, Mohs hardness of 6.0.
[2]SIC400 green silicon carbide from Micro Abrasives Corporation, average particle size is 17 microns, Mohs hardness of 9.3.

The data presented in Table 2 demonstrate some improvement in the mar resistance of liquid radiation curable coatings which contain alumina (Mohs hardness 9.0) with the addition of particles such as silica (Mohs hardness 6.0), and a significant improvement in mar resistance with the addition of very hard particles such as green silicon carbide (Mohs hardness 9.3).

Whereas particular embodiments of this invention have been described above for purposes of illustration, it will be evident to those skilled in the art the numerous variations of the details of the present invention may be made without departing from the invention as defined in the appended claims.

Therefore, we claim:

1. A coating formed from a composition comprising;
   a curable film-forming resin; and
   a plurality of particles evenly dispersed in the coating when it is cured and having an average particle size between 0.1 and 50 microns dispersed in said resin, wherein the particles have a hardness sufficient to impart greater mar and/or scratch resistance to the coating as compared to a coating where no particles are present, and wherein the difference between the refractive index of the resin and the refractive index of the particles ranges from 1 to 1.5.

2. The coating of claim 1, wherein said particles comprise organic particles.

3. The coating of claim 2, wherein said organic particles comprise diamond particles.

4. The coating of claim 2, wherein said organic particles comprise silicon carbide, titanium carbide and/or boron carbide.

5. The coating of claim 2, wherein said organic particles comprise silicon carbide particles.

6. The coating of claim 2, wherein said organic particles comprise silicon carbide particles having a median particle size of 20 microns or less.

7. The coating of claim 1, wherein said particles comprise inorganic particles.

8. The coating of claim 7, wherein said particles comprise silica and/or alumina.

9. The coating of claim 1, wherein said coating is formed from a powder coating composition.

10. The coating of claim 1, wherein said coating is formed from a liquid composition.

11. The coating of claim 10, wherein said liquid composition comprises a thermally curable composition and/or a radiation curable composition.

12. The coating of claim 1, wherein the film-forming resin comprises at least one reactive functional group containing polymer and at least one curing agent having functional groups reactive with the functional group of the polymer.

13. The coating of claim 1, wherein the particles have an average particle size of 20 microns or less.

14. The coating of claim 12, wherein the particles have an average particle size of 10 microns or less.

15. The coating of claim 1, wherein the average Mohs hardness of the particles is 5 or greater.

16. The coating of claim 15, wherein the average Mohs hardness of the particles is 8 or greater.

17. A coated substrate comprising a substrate, and the coating of claim 1 over at least a portion of the substrate.

18. The coated substrate of claim 17, wherein said substrate comprises a metallic substrate, a polymeric substrate, and/or a wood substrate.

19. A method for improving the scratch and/or mar resistance of a substrate comprising applying to at least a portion of the substrate the coating of claim 1.

20. A method for preparing a powder coating comprising extruding together a film-forming resin and a plurality of particles, wherein the particles have a hardness sufficient to impart greater mar and/or scratch resistance to the coating as compared to a coating where no particles are present, and wherein the difference between the refractive index of the resin and the refractive index of the particles ranges from 1 to 1.5.

21. A coating formed from a composition comprising:
   a curable film-forming resin; and
   a plurality of particles comprising silicon carbide and alumina, said particles being evenly dispersed in the coating when it is cured, wherein the particles have a hardness sufficient to impart greater mar and/or scratch resistance to the coating as compared to a coating where no particles are present, and wherein the difference between the refractive index of the resin and the refractive index of the particles ranges from 1 to 1.5.

22. The coating of claim 21 wherein the silicon carbide particles are present in an amount of from 0.01 to 1 weight percent, and the alumina particles are present in an amount of from 1 to 25 weight percent, with weight percent based on total weight of the coating composition.

23. The coating of claim 21 wherein the silicon carbide particles have an average particle size of 15 microns or more, and the alumina particles have an average particle size of 5.5 microns or less.

24. The coating of claim 21, wherein said coating is formed from a liquid composition.

* * * * *